United States Patent
Hanay et al.

(10) Patent No.: US 12,405,204 B2
(45) Date of Patent: Sep. 2, 2025

(54) METHOD AND DEVICE FOR IDENTIFYING THE MATERIAL TYPE OF PARTICLES IN LIQUID

(71) Applicant: Mehmet Selim Hanay, Ankara (TR)

(72) Inventors: Mehmet Selim Hanay, Ankara (TR); Uzay Tefek, Ankara (TR)

(73) Assignee: Mehmet Selim Hanay, Ankara (TR)

( * ) Notice: Subject to any disclaimer, the term of this patent is extended or adjusted under 35 U.S.C. 154(b) by 125 days.

(21) Appl. No.: 18/337,451

(22) Filed: Jun. 20, 2023

(65) Prior Publication Data

US 2023/0408396 A1 Dec. 21, 2023

Related U.S. Application Data

(60) Provisional application No. 63/353,633, filed on Jun. 20, 2022.

(51) Int. Cl.
| | |
|---|---|
| *G01N 15/1031* | (2024.01) |
| *B01L 3/00* | (2006.01) |
| *G01N 15/10* | (2024.01) |

(52) U.S. Cl.
CPC .... *G01N 15/1031* (2013.01); *B01L 3/502715* (2013.01); *B01L 2200/0647* (2013.01); *B01L 2300/0636* (2013.01); *B01L 2300/0645* (2013.01); *G01N 2015/1029* (2024.01)

(58) Field of Classification Search
CPC ....... G01N 15/1031; G01N 2015/1029; G01N 15/0266; G01N 2015/0038; B01L 3/502715; B01L 2200/0647; B01L 2300/0636; B01L 2300/0645
USPC ........................................................ 324/671
See application file for complete search history.

(56) References Cited

U.S. PATENT DOCUMENTS

| | | | | |
|---|---|---|---|---|
| 9,515,378 B2* | 12/2016 | Prasad | ................... | H01Q 1/245 |
| 2006/0192557 A1* | 8/2006 | Kloza | .................... | G01R 33/30 |
| | | | | 324/318 |
| 2013/0258318 A1 | 10/2013 | Ayliffe | | |

FOREIGN PATENT DOCUMENTS

| | | | | |
|---|---|---|---|---|
| GB | 1425972 A | 2/1976 | | |
| WO | WO-2012176217 A1 * | 12/2012 | ............... | H01Q 3/00 |

OTHER PUBLICATIONS

Kirkegaard, Julie, et al. "Study of paclitaxel-treated HeLa cells by differential electrical impedance flow cytometry." Biosensors 4.3 (2014): 257-272. (Year: 2014).*

Daguerre, Hugo, et al. "Positional dependence of particles and cells in microfluidic electrical impedance flow cytometry: Origin, challenges and opportunities." Lab on a Chip 20.20 (2020): 3665-3689. (Year: 2020).*

(Continued)

*Primary Examiner* — Christopher P McAndrew
(74) *Attorney, Agent, or Firm* — Bayramoglu Law Offices LLC

(57) ABSTRACT

A method and a device to identify the material type of particles in a liquid are provided. The device is a microfluidic platform with a liquid channel for the material identification of a particle, the microfluidic platform includes electrodes forming a low-frequency sensor for measuring the geometric size of a particle passing through the liquid channel and electrodes forming a high-frequency sensor for measuring the capacitance change induced by the particle in the liquid channel. The technique combined both of these measurements to extract the dielectric permittivity of the particle.

5 Claims, 6 Drawing Sheets

(56) References Cited

OTHER PUBLICATIONS

Sun, Tao, et al. "High speed multi-frequency impedance analysis of single particles in a microfluidic cytometer using maximum length sequences." Lab on a Chip 7.8 (2007): 1034-1040. (Year: 2007).*
Haandbæk, Niels, et al. "Characterization of subcellular morphology of single yeast cells using high frequency microfluidic impedance cytometer." Lab on a Chip 14.2 (2014): 369-377. (Year: 2014).*
Adele De Ninno, et al., Coplanar electrode microfluidic chip enabling accurate sheathless impedance cytometry†, Lab on a Chip, 2017, pp. 1158-1166, vol. 17.
M. Nikolic-Jaric, et al., Microwave frequency sensor for detection of biological cells in microfluidic channels, Biomicrofluidics, 2009, pp. 034103(1-15), vol. 3.

* cited by examiner

METHOD AND DEVICE FOR IDENTIFYING THE MATERIAL TYPE OF PARTICLES IN LIQUID

CROSS REFERENCE TO THE RELATED APPLICATIONS

This application is based upon and claims priority to the U.S. provisional application No. 63/353,633, filed on Jun. 20, 2022, the entire contents of which are incorporated herein by reference.

TECHNICAL FIELD

The invention is based on a method to electronically identify the material type of particles in a liquid.

BACKGROUND

Determination of the material content of microscale objects is critical in materials, biologic and environmental sciences. For environmental science applications, it is observed that plastic pollution has reached significant proportions today. One of the most critical components of plastic pollution is microplastic particles, which are smaller than 5 mm in size and generally occur as a result of mechanical and chemical corrosion of larger plastic particles in nature. Due to their small size, microplastics accumulating in aquatic food sources such as fish and mussels also reach vital organs and tissues in the body, posing a health threat.

Identification of the material type of microscale contaminants in a liquid is an important biological and environmental problem. Especially challenging is the identification of microplastics and nanoplastics in a rapid manner; since existing techniques such as Fourier Transform Infrared Spectroscopy or Micro-Raman Spectroscopy take a long time (on the order of ten minutes) to analyze a single microparticle.

In the state of the art, various methods have been proposed for the solution of the above problem. GB1425972 patent application, discloses identifying particles by using optical measurement methods. US2013258318 patent application, discloses characterization of particles in a fluid by using optical and electrical techniques together.

When the available techniques are examined, the way to detect microplastic pollution basically goes through 3 different steps:

Sample collection and filtering: samples are taken from different sources in nature and separated from large volumes by filtering. Water resources, organisms or solid layers such as soil may serve as the sample source.

Optical microscope analysis: the sample obtained in first step is dried on a glass surface. Locations of possible microplastic particles are detected under the optical microscope.

Material analysis: In order to understand whether the particles identified in second step are plastic, standard analytical chemistry techniques such as FTIR (Fourier Transform Infrared Spectroscopy) or Micro-Raman Spectroscopy are applied on each particle.

However, especially the second and third steps have some disadvantages.

Used techniques are laboratory-level techniques, as they require optical-based equipment. It is difficult to take these techniques and conduct on-site analysis.

These techniques are time-consuming: drying the sample, selecting possible particles under the microscope, performing FTIR or micro-Raman analysis with sufficient sensitivity.

FT-IR systems are very expensive. It can measure particles up to only 20 micrometers. And the sample should be dry.

Micro-Raman Spectroscopy systems are also very expensive. In practice, it works up to 20 micrometers, but in ideal cases it can go down to 1 micrometer. But it does not work on black and dark particles.

Pyrolysis Gas Chromatography; Multi spectral Imaging; Staining Microplastics with Fluorescence; Acoustophoresis, Impedance Spectroscopy are other ways for the same purpose. However, there is still a strong need for a low-cost device that is field-deployable and that can detect and quantify microplastics in situ, operating down to 1 micrometer without color restriction.

SUMMARY

The present invention relates to a method and device for classifying microparticles in general, and microplastic particles in particular. The main objective of the invention is to develop a method and device ensuring identifying of microparticles based on their dielectric permittivity levels by conducting two electronic measurements on the same microparticle.

The invention provides identifying microparticles by using their dielectric permittivity measurements in the microwave band.

The proposed invention offers portability and low-cost in the form of compact devices to work on-site. This way, it becomes possible to track how the number and composition of microscopic pollutants, including microplastics, change spatially and temporally. In addition, it is possible for this invention to work up to particles down several hundred nanometers without any constraints on the color of particles.

The proposed device can be used to detect and quantify microplastic pollution on the field such as water resources. Indeed, polystyrene used in the experiments as a model species constitute a typical example of the microplastic particles; whereas soda lime glass is the most prevalent glass used in bottles and windows. Therefore, the proposed solution can be used for rapid testing of microplastics. For the invention to work, the low frequency and high frequency measurements do not have to be conducted sequentially: they can be conducted simultaneously on a particle by the suitable arrangement of electrodes.

The proposed method can also be applied for nanoparticle analysis, for instance to screen the cargo content of a lipid nanoparticle in biotechnology applications such as in mRNA vaccines. The invention can be applicable many areas for instance environmental sensors, in biotechnology applications, monitoring of water resources, plastics and bottling industry etc.

DETAILED DESCRIPTION OF THE EMBODIMENTS

To overcome the challenge of differentiating non-biological microparticles in a potentially low-cost and high-throughput system, two different electronic sensors, operating at frequencies more than three orders-of-magnitude apart: a low frequency (~1 MHz) impedance sensor and a high-frequency sensor (FIG. 1) is used.

The vast frequency difference enables the two sensors to provide two parameters complementary to each other. The low-frequency sensor detects the geometrical volume of the particle (and its height) within the channel; whereas the microwave sensor yields electrical size which is a function of the particle geometrical volume and the Clausius-Mossotti factor of the particle, a factor that depends on the particle's electrical permittivity and provides a means for material differentiation (since different materials will have different electrical permittivity levels under the same conditions). The platform on two common classes of non-biological microparticles approximately 20 μm in diameter is tested: polystyrene (a typical microplastic) and soda lime glass (the most common household glass). Despite the low intrinsic contrast, our reported microfluidic sensor provided particle material identification with 94% accuracy.

Figure 1:
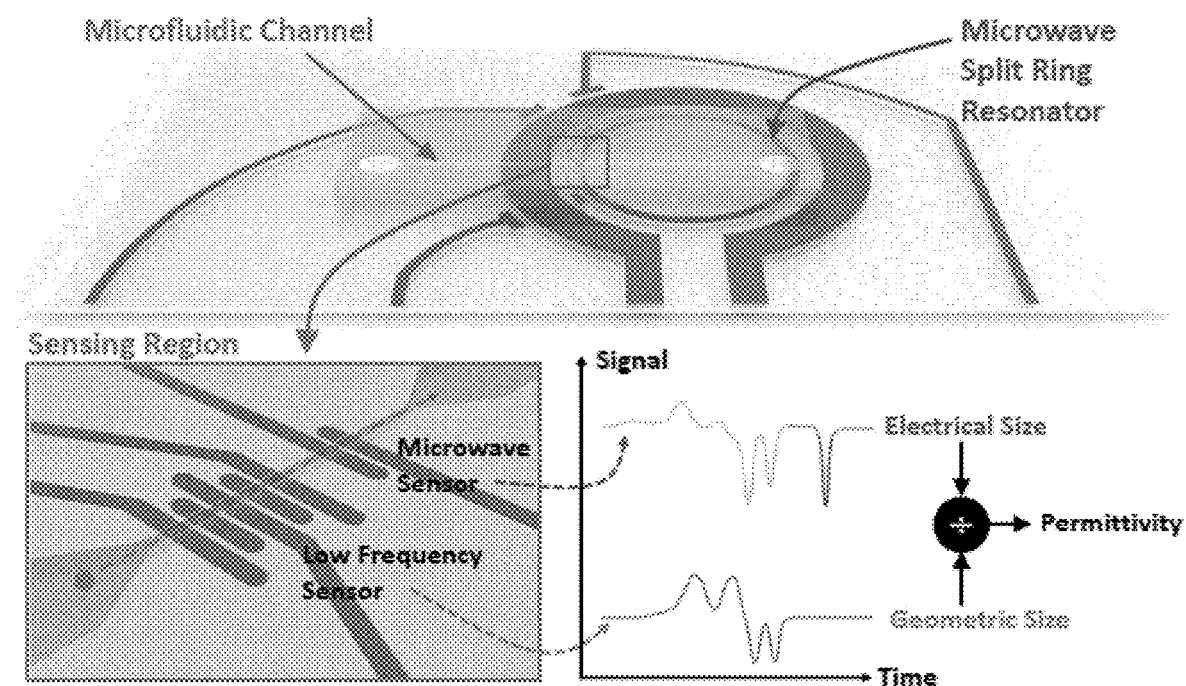
FIG. 1: Sensing platform of the invention

Sensing concept of the invention is given in FIG. 1. On the microfluidic platform, there are two electronic sensors, a low-frequency sensor with five electrodes and a microwave sensor (in the form of a split-ring resonator). As a particle passes through the sensing region, it induces signals that encode its geometric and electrical size (as well as the height of the particle in the channel, which is used for compensating positional dependency). By combining electrical and geometric size, the permittivity of each particle is deduced.

The microparticles are identified based on their dielectric permittivity levels by conducting two electronic measurements on the same microparticle by this invention. Method of the invention comprises two measurements as low frequency impedance measurement and high frequency capacitance measurement.

The low frequency impedance measurement used to determine the geometric volume of the particle. The high frequency capacitance measurement used to determine the electrical volume of the particle defined as multiplication of the Clausius-Mossotti Factor and the geometrical volume of the particle. By dividing the electrical volume to the geometrical volume, the Clausius-Mossotti Factor can be determined, which in turn provides the dielectric permittivity value of the material. From the dielectric permittivity value, the identity of the material can be identified.

Geometric volume measurement can be made either by the Coulter or by impedance cytometry. In this measurement, the current through a narrow hole in a liquid is tracked. when a particle blocked this hole, the change in current is proportional to the particle volume.

$$\Delta I \sim V_{particle} \qquad (1)$$

The difference between low frequency and high frequency depends on the electrical properties of the liquid. At low frequencies, the ions in a liquid (electrolytes) can accumulate in the liquid/solid interfaces which in turn shield the effect of electric field. As a result, low frequency impedance measurements generally probe the current flowing between voltage-biased metal electrodes. The current flows through the liquid by ionic conductivity. When a particle crosses the path of the current, it blocks or alters the conductivity. Since the change in conductivity is proportional to the volume of the particle, such current measurements can provide the geometrical volume of the particle. In this regard, Coulter principle (resistive pulse sensing) can be used to determine the amount of blockage, a particle causes in a constriction. Alternatively, impedance cytometry methods can be used where the geometry of electrodes in a liquid channel is considered in the data analysis to obtain the geometric volume of the particle [1]. On the other hand, at high frequencies, the electrolytes are not mobile enough to follow electrical field and they cannot effectively shield the electrical field. This way, an electrical field can be applied inside a liquid channel which also penetrates into microparticles. Therefore, the change in the capacitance between two electrodes induced by the passage of a microparticle can be measured at high frequencies. This capacitance change is proportional to the Clausius-Mossotti factor and the geometrical volume of the particle. By calculating or calibrating the response of both low frequency and high frequency electronic measurements, Clausius-Mossotti factor of the particle can be obtained which then yields the dielectric permittivity of the particle. For aqueous solutions with high ion concentrations, as used commonly in biological applications (such as Phosphate-buffered saline solution), a frequency smaller than 2 MHz can be readily chosen as low frequency, and larger than 1 GHz as high frequency. For aqueous solutions with lower ion concentrations, these frequency values decrease in accordance with the dynamics of electric field screening.

To demonstrate the proof of operation of the technique, experiments are conducted by using polystyrene and soda lime glass particles. Diameters of polystyrene particles are reported as 14-20 μm by the manufacturer, whereas diameters of soda lime glass particles are reported to be in range 15-22 μm. Aside from geometric properties of inorganic microparticles, the parameter that is used to classify these materials is permittivity. The relative permittivity of polystyrene is reported approximately as 2, whereas for soda-lime glass is reported around 7 at microwave frequencies. Based on this permittivity difference, inorganic materials can be classified with high probability.

The high frequency electronic signal that these particles induce, is proportional to the Clausius-Mossotti Factor, $K_{CM}$, defined as:

$$K_{CM} \equiv \frac{\epsilon_{particle} - \epsilon_{medium}}{\epsilon_{particle} + 2 \times \epsilon_{medium}} \qquad (2)$$

Here $\epsilon_{particle}$ refers to the dielectric permittivity of the particle at the operation frequency, whereas $\epsilon_{medium}$ refers to the dielectric permittivity of the liquid. For a high frequency operation at 5.4 GHz, water has permittivity of approximately 75. The Clausius-Mossotti Factor for the polystyrene is calculated at −0.48 and the soda-lime glass is −0.43. As described in literature [2], the capacitance change obtained by the high frequency measurement yields a capacitance change ΔC:

$$\Delta C = V_p \epsilon_{medium} \times K_{CM} \qquad (3)$$

where $V_p$ is the particle volume. Since $\epsilon_{medium}$ is a known/measurable quantity, and since the low frequency measurements can yield particle volume $V_p$ independently [1], then one can divide the capacitance change to $V_p$ to obtain the $K_{CM}$. From the measured $K_{CM}$ value and know $\epsilon_{medium}$ value, the permittivity of the particle can be obtained as:

$$\epsilon_{Particle} = \epsilon_{medium} \frac{1 + 2K_{CM}}{1 - K_{CM}} \qquad (4)$$

Figure 2:
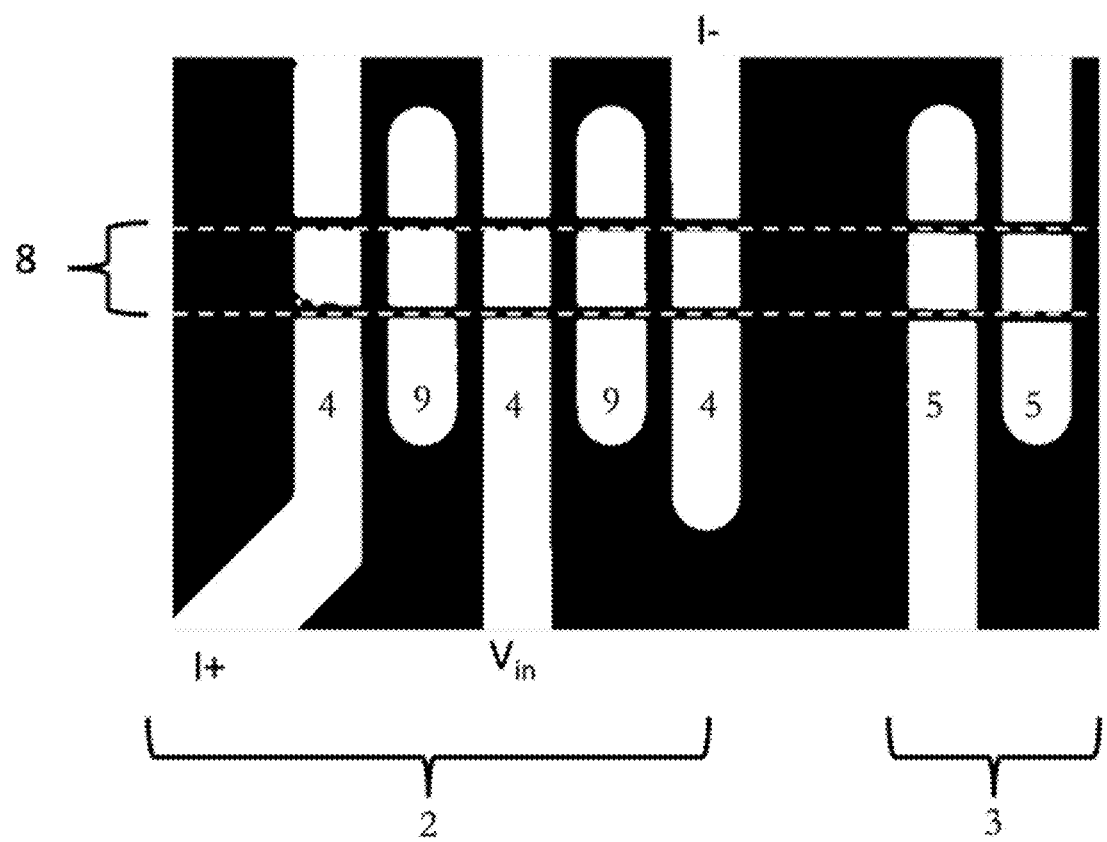
FIG. 2: Micrograph of the Device

The experiments were conducted with a microfluidic device consisting of glass substrate and a Polydimethylsiloxane (PDMS) cover which contains the liquid channel and the input/output ports. Gold electrodes are fabricated on the glass substrate to operate as low frequency and high frequency electronic sensor. For the low-frequency sensor, preferably a pattern of 5 electrodes were used as shown in FIG. 2. Pattern is in such a way that, 3 active electrodes (4) are located on first, third and fifth places and 2 floating electrodes are located on second and fourth places as shown in FIG. 2. Here the input voltage is introduced on the central electrode (active electrode (4) at third place) and the differential currents are read by the edge electrodes (active electrode (4) at first and fifth places) through a differential amplifier. The electrodes at second and fourth places (9) are left floating to reduce the variability of the signal due to height. For the high-frequency sensor (3), a microwave resonator is used. In this particular case, a split ring resonator is used where the sides of the gap serves as electrodes (5) for the microwave measurements. In another embodiment the low-frequency sensor, may comprise a pattern of 7 electrodes.

Figure 3:
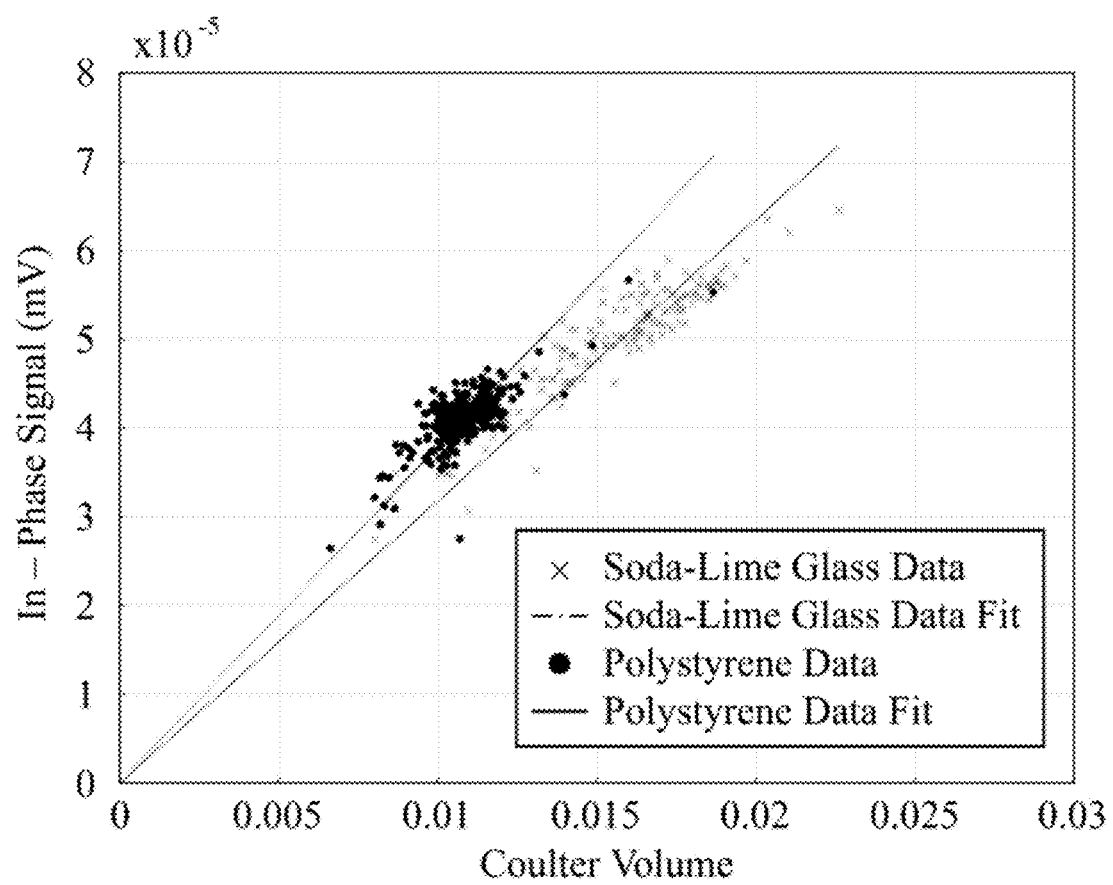
FIG. 3: Example scatter plot showing the response of polystyrene and soda lime glass microparticle without the correction for particle height

The experimental data with the polystyrene particles and soda-lime glass are obtained and shown in FIG. 3. As can be seen from FIG. 3, the two class of materials can be separated from each other by using the low frequency and high frequency measurements. Moreover, the classification results can be greatly improved by using the height correction protocol described in the literature. With this correction, the separation of the two different types of microparticles become more evident. Moreover, the ratio of the slopes of the best fit lines between the polystyrene and the soda-lime glass attains a value of 1.12. This value matches closely the theoretically expected value of 1.04. Therefore, the separation of two different materials with the proposed technique is demonstrated.

The proposed method to determine the dielectric coefficients of microparticles passing through a liquid channel, namely the main subject of the invention, is to measure the geometric size of the particle passing through a channel by a method of current change to be made in direct current (DC) or low frequencies, and electrical size, impedance change measurements with microwave resonators. These two measurements can be made in any order or at the same time. By combining the data obtained from these two measurements, the dielectric coefficient of the particle can be determined, and it can be understood what material it is made of.

An important point here is the frequency of measurement. If low frequency is used, it cannot be measured due to Debye screening. Under physiological conditions, operating in the low microwave band (1-20 GHz) prevents this effect. It can also be operated at lower frequencies in liquids with less electrolyte.

Figure 4:
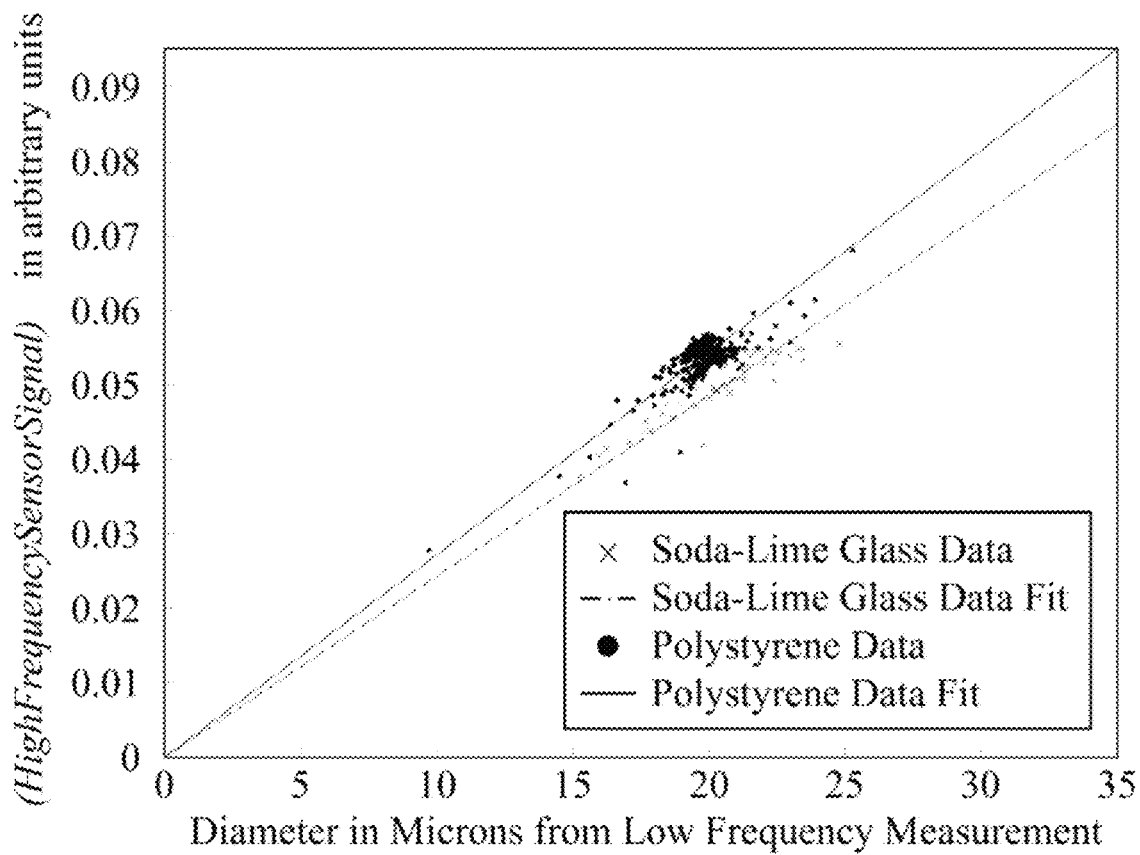
FIG. 4: Example scatter plot showing the response of polystyrene and soda lime glass microparticle with the correction for particle height
Figure 5:
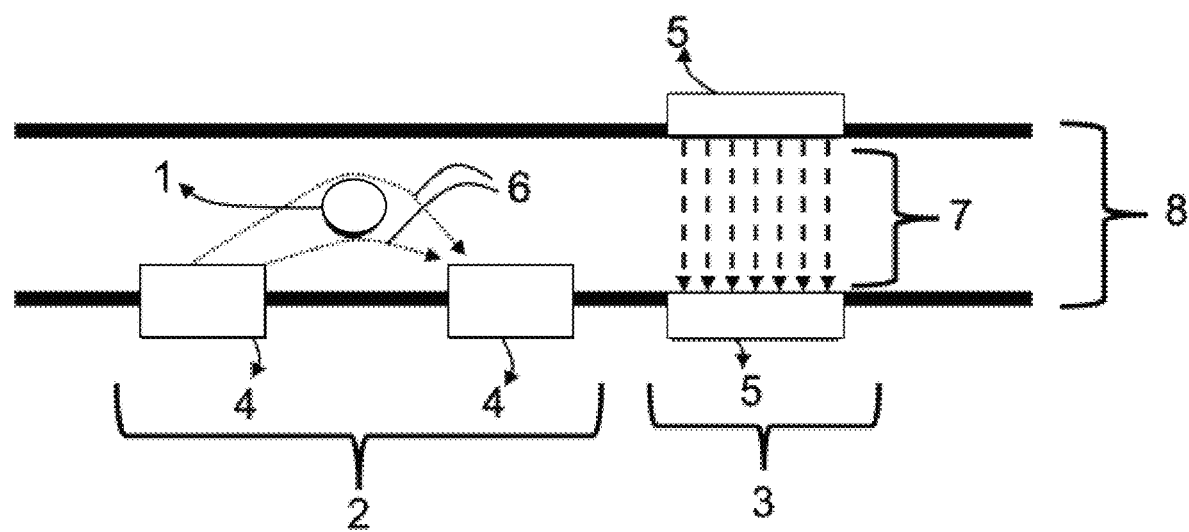
FIG. 5: The general view of schematic of the method of the invention

As shown FIG. 5, a small particle (1) in a liquid channel (8) is measured by a low-frequency sensor (2) and high-frequency sensor (3). The order of sensing is not critical; the two measurements can be performed simultaneously by locating one of the sensor within the sensing region of the other sensor. The low frequency-sensor (2) is sensitive to the particle's volume since the particle (1) blocks the ionic current (6) between the electrodes (4) of the low-frequency sensor. The high-frequency sensor (3) can measure the capacitance change induced by the particle, since the Electric Field (5) generated at a sufficiently high frequency that the ions (7) cannot move fast enough to shield its electric field. As a result, the high-frequency sensor (3) gives a signal proportional to the Clausius-Mossotti factor of the particle and the volume of the particle. By dividing the high-frequency sensor measurement to the low-frequency sensor measurement, an intrinsic quantity of the particle proportional to its Clausius-Mossotti factor can be obtained. This factor depends on the dielectric permittivity of the material and can be used to differentiate particles of different materials as shown in FIG. 3 and FIG. 4. To increase the resolution of the low-frequency sensor multi-electrode arrangements can be used which is reported in the literature. An example shown in FIG. 2 contains five electrode arrangement where in addition to three active electrodes (4) for differential impedance measurements, two floating electrodes (9) help to reduce the variation in the signal due to the height of the particle. The high-frequency sensor (3) can have the form of a microwave resonator, such as a split ring resonator or a coplanar waveguide resonator, with a narrow sensing region to intensify the electric Field. The capacitive change induced by the particle (1) on the high-frequency sensor (3) can be obtained by tracking the phase and amplitude response of the microwave sensor.

An exemplary application of the invention is given in FIG. 6 and explained below.

Standard microfabrication and soft lithography techniques were used to fabricate a glass/PDMS microfluidic system with a gold layer serving as the electrodes for both the low frequency and microwave sensors. The fabricated device contains a liquid channel for analyte transportation, three gold tracks as the electrical ports of the low-frequency sensor, and one Sub-Miniature Version A (SMA) connector for microwave sensing. The two concentric circles of the microwave resonator, called a split ring resonator (SRR) explained in more detail below. The sensing part of the device consists of two adjacent regions as shown in FIG. 2:

1) five consecutive electrodes for low-frequency measurements where the geometric size and height values of particles are obtained,
2) two microwave electrodes used for electrical volume measurements (they form a gap in the inner circle of the split ring resonator).

Figure 6:
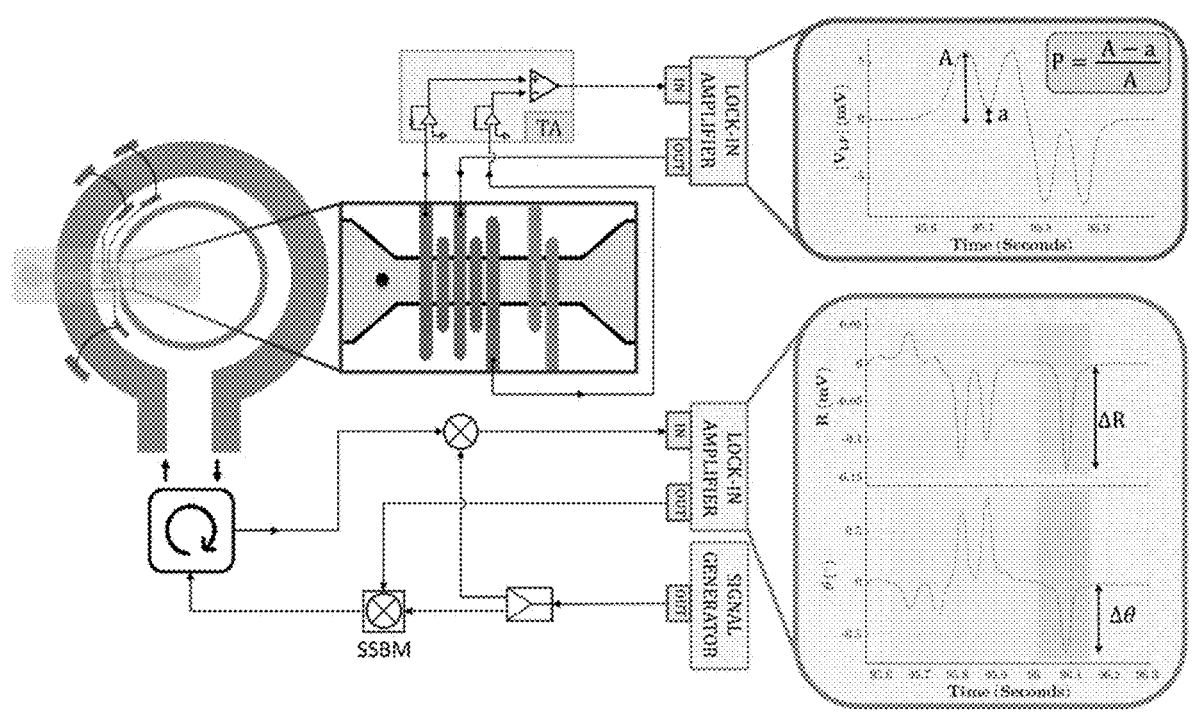
FIG. 6: Exemplary application of the Device 1. Particle
2. Low-Frequency sensor
3. High-Frequency sensor
4. Active Electrodes for Low-Frequency Sensor
5. Electrodes for High-Frequency Sensor
6. Ionic current
7. Electric Field
8. Liquid Channel
9 Floating Electrodes

As it is shown in FIG. 6, the liquid channel, the split ring resonator for microwave sensor terminated by an SMA connector, and three gold tracks for the low-frequency sensor which are wire bonded to the pads to pass over the rings of the SRR. A micrograph of the sensing region. The electrodes 1-3-5 are connected to the corresponding tracks in part. The low frequency excitation is provided from the 3rd electrode and collected from the 1st and 5th electrodes. The 2nd and 4th electrodes are kept floating to facilitate height measurements. The right two electrodes are for high frequency (microwave) measurements. SSBM stands for single side-band modulator and TA for Transimpedance Analyzer. Low frequency current signal of a passing particle forms a bipolar Gaussian shape also sis shown in FIG. 6. The geometric size and height values of the particles are calculated from this measurement. The change in amplitude (R) and phase (θ) values in the highlighted sections are used to calculate the capacitance change induced by the particle.

Optical microscopy was used to observe the passage of particles through the sensing region concurrently with electronic measurements. For the analyte transportation, a PDMS microchannel which was sealed by the sensor chip is used. The microchannel was pressurized by Fluigent MFCS-EZ pressure control system and the analyte particles were passed through a constriction where all the electrodes were placed. The purpose of the constriction was to enhance the resolution of the current measurement signal and to reduce the passage of multiple particles simultaneously from the sensing region. The dimensions of the constriction were 60 µm in width and 45 µm in height. The flow rates through the constriction ranged from 2.4 µL/min to 4.8 µL/min. Particles typically passed through the sensing region within a duration of 20 ms each. The low frequency part of the sensor closely follows the recent work 2, 27-29. Here, a five electrode arrangement was used to obtain the geometric size of the particles while calibrating for the effect of height variation of particles as they flow through the channel (FIG. 2 and FIG. 6). In the five-electrode arrangement, the 3rd electrode is used to provide a 1 MHz AC excitation voltage while the 1st and 5th electrodes are used to collect the resulting differential current. This current is carried by the ions in the solution, and a non-conducting particle passing through the channel blocks the ionic motion, resulting in a drop in the current proportional to the particle's volume. The remaining two electrodes, electrode 2 and 4, were kept floating: they were used to facilitate the height measurements by modifying the electric field between the middle and outer electrodes. A particle passing near the bottom of the channel induces a large variation in the current along its trajectory, whereas the current waveform is smoother for an identical particle passing near the top of the channel 2, 27-29. This way, the variation in the current for each trajectory was encoded by the ratio between the large and small peaks in the signal waveform (FIG. 6). This ratio, prominence (P), was then used to calculate the height of each particle and calibrate its response to obtain the geometric size accurately. For the size and height measurement by the low-frequency sensor, the 3rd electrode is driven by a 1 V peak-to-peak signal at 1 MHz from a lock-in amplifier (Zurich Instruments, HF2LI) and the resulting current is collected from the outer electrodes by a differential readout configuration. The current signals were converted into voltage by a transimpedance amplifier (Zurich Instruments, HF2TA), and read out by a lock-in amplifier (Zurich Instruments, HF2LI) in differential mode.

For electrical volume measurements at microwave frequencies, split ring resonator (SRR) is used, which consists of two concentric rings. The microwave signal was fed through the outer ring which inductively excites the inner one. Since there was a split (a gap) along the inner ring, a standing-wave mode shape emerges and creates a high intensity electric field in the split region. To increase the signal generated by the target particles, the width of the split gap was chosen to be 20 µm. After verifying the resonance characteristics of the SRR with a vector network analyzer (VNA), we switched to our custom circuitry (FIG. 6) and set the frequency of the signal generator to the resonance frequency (~5.4 GHz). The circuit consists of two lock-in amplifiers to employ single side band modulation (SSBM) and a signal generator as signal sources. We fed the SRR at its resonance frequency with 500 mVpk power output. The time constant of the lock-in amplifiers was set to 501 µs and sampling rate were 13.39 k/sec to fully detect rapidly passing particles. Since the maximum operational frequency of the lock-in amplifiers were below the resonance frequency, a custom Single Side Band (SSB) heterodyne circuitry 16,17 is built. The reference signal outputs of the lock-in amplifiers were up-converted before entering the resonator and down-converted back before digitally reading the amplitude and phase of the signal.

The device of the invention for identifying of microparticles based on their dielectric permittivity levels by conducting two electronic measurements on the same microparticle comprises, five consecutive electrodes forming the low-frequency sensor (2) for measuring the geometric size of the particle (1) passing through a liquid channel (8) by using low frequency, At least one high-frequency sensor (3) for measuring of the capacitance change induced by the particle (1) in liquid channel (8), Method for identifying of microparticles based on their dielectric permittivity levels by conducting two electronic measurements on the same microparticle, comprises steps of;

Transferring of the sample in the liquid channel (8),

Ensuring to pass of microparticles in the liquid channel (8),

Applying of low frequency on particles,

Measurement of a low frequency impedance to determine the geometric volume of the particle by using of low-frequency sensor (2) in liquid channel (8), Applying of high frequency on particles, Measurement of a high frequency capacitance to determine the electrical volume of the particle defined as multiplication of the Clausius-Mossotti Factor and the geometrical volume of the particle, By dividing the electrical volume to the geometrical volume, determining the Clausius-Mossotti Factor, which in turn provides the dielectric permittivity value of the material, Classification of the material from the dielectric permittivity value by the processor.

REFERENCES

1. De Ninno, Adele, Vito Errico, Francesca Romana Bertani, Luca Businaro, Paolo Bisegna, and Federica Caselli. "Coplanar electrode microfluidic chip enabling accurate sheathless impedance cytometry." Lab on a Chip 17, no. 6 (2017): 1158-1166.
2. Nikolic-Jaric, M., S. F. Romanuik, G. A. Ferrier, G. E. Bridges, M. Butler, K. Sunley, D. J. Thomson, and M. R. Freeman. "Microwave frequency sensor for detection of biological cells in microfluidic channels." Biomicrofluidics 3, no. 3 (2009): 034103

What is claimed is:

1. A microfluidic platform with a liquid channel for a material identification of a particle, comprising a first set of electrodes forming a low-frequency sensor for measuring a geometric size of the particle passing through the liquid channel and a second set of electrodes forming a high-frequency sensor for measuring a capacitance change induced by the particle in the liquid channel, wherein the first set of electrodes contains five electrodes, wherein the five electrodes forming the low-frequency sensor comprise three active electrodes and two floating electrodes, the three active electrodes comprises a first active electrode, a second active electrode, and a third active electrode, and the two floating electrodes comprise a first floating electrode and a second floating electrode, wherein the first floating electrode is located between the first active electrodes and the second active electrode, and the second floating electrode is located between the second active electrode and the third active electrode.

2. The microfluidic platform according to claim 1, wherein the three active electrodes are connected to three tracks as electrical ports of the low-frequency sensor.

3. The microfluidic platform according to claim 1, wherein the first set of electrodes contains seven electrodes.

4. The microfluidic platform according to claim 1, wherein the high-frequency sensor is a split ring resonator at microwave frequencies.

5. A method of operating the microfluidic platform according to claim 1, comprising steps of:
- transferring the particle through the liquid channel;
- measuring a current change in the low-frequency sensor induced by the particle to determine a geometric volume of the particle;
- measuring an amplitude change and a phase change of the high-frequency sensor induced by the particle to determine an electrical volume of the particle;
- determining a Clausius-Mossotti factor of the particle by using the electrical volume and the geometric volume; and
- determining a dielectric permittivity value of the particle.

\* \* \* \* \*